J. TAYLOR.

Evaporating Pan.

No. 83,106.

Patented Oct. 13, 1868.

Witnesses

Inventor
James Taylor

JAMES TAYLOR, OF CANTON, NEW YORK.

Letters Patent No. 83,106, dated October 13, 1868.

IMPROVED SUGAR-JUICE EVAPORATOR.

The Schedule referred to in these Letters Patent and making part of the same.

*To all whom it may concern:*

Be it known that I, JAMES TAYLOR of Canton, in the county of St. Lawrence, and State of New York, have invented a new and improved Evaporator; and I do hereby declare that the following is a full, clear, and exact description thereof, which will enable those skilled in the art to make and use the same, reference being had to the accompanying drawings, forming part of this specification.

This invention relates to the evaporation of sap for making maple-sugar, for evaporating the juice of the sorghum, for making sirup or sugar, and for salt water in making salt.

And it consists in a peculiarly-constructed evaporating-pan, provided with truck-wheels, and mounting it on a track, so that it may be moved from the fire, when desired, as I will proceed to describe.

Similar letters of reference indicate corresponding parts.

Figure 1:
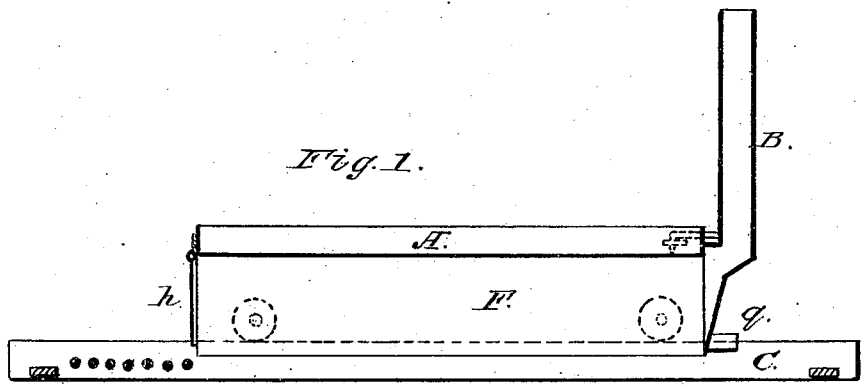
Figure 1 is a longitudinal section of the evaporator, through the line $x\,x$ of fig. 2.
Figure 2:
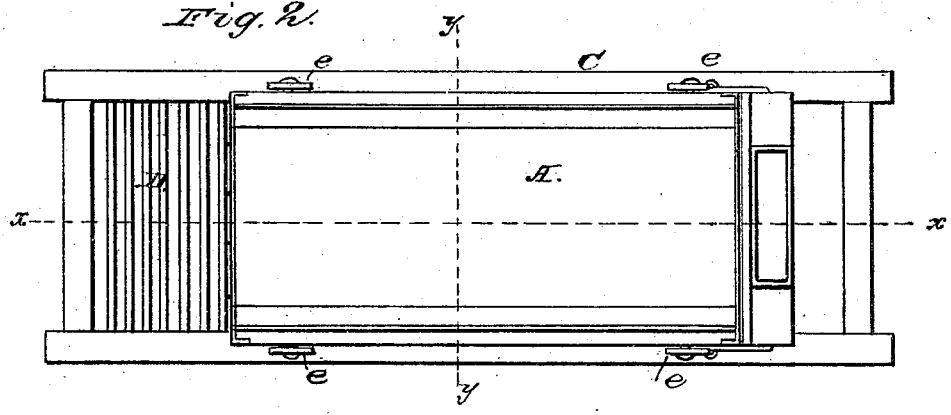
Figure 2 is a top or plan view, with the pan moved back on the track from the grate.
Figure 3:
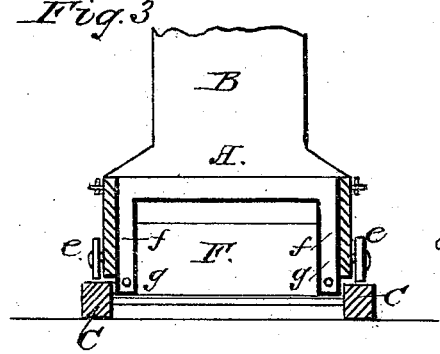
Figure 3 is a cross-section, through the line $y\,y$ of fig. 2.

A represents the evaporator or pan.

B is the chimney.

C represents the track.

D is the fire-grate.

$e\,e$ represent the truck-wheels on the sides of the evaporator.

F is the fire-box.

In using this evaporator, the grate D is laid over a small excavation in the ground, which answers for an ash-pit, and the fire-box extends the whole length of the evaporator.

The evaporator is in the form of a rectangular shallow pan, with what is known in boiler-making as "water-legs" on each side, so that the fire, or products of combustion are surrounded by the liquid, and a very extended surface is presented for the absorption of heat.

$f\,f$ represent the legs, or cavities, which are filled with the sap or other liquid.

In granulating the sirup, and in certain other stages of the process of making sugar, it is indispensable that the evaporating-pan should be suddenly removed from the fire, otherwise the contents are burned or damaged.

By providing a railroad-track, which shall enclose the fire-grate, as seen in the drawing, the pan may be run back, out of the way of the fire, at the slightest notice of danger.

$g\,g$ indicate cocks for drawing off the liquid.

$h$ is the fire-door for the introduction of fuel, which door is hinged to the pan on its upper side.

The advantages of this method of constructing the evaporating-pan, and moving it from and to the fire, will be readily understood and appreciated by all who are acquainted with the subject.

I claim as new, and desire to secure by Letters Patent—

The described construction of the pan A, having its sides extended to form legs $f\,f$, and the side walls of the fire-box, the latter provided with the door $h$ at one end, and the chimney B at the other, all arranged to be moved upon the wheels $e$, away from or over the grate D, formed between the ways C, as herein set forth, for the purpose specified.

The above specification of my invention signed by me, this 5th day of May, 1868.

JAMES TAYLOR.

Witnesses:
WM. F. MCNAMARA,
ALEX. F. ROBERTS.